Figure 1:
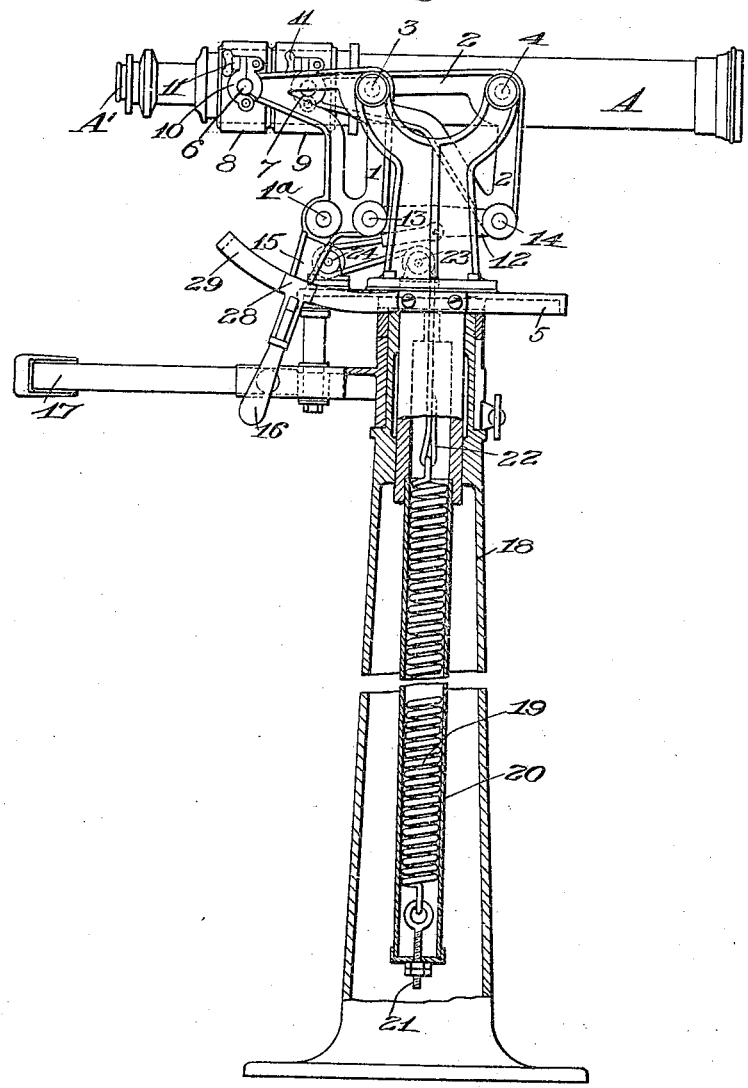

G. N. SAEGMULLER.
TELESCOPE MOUNT.
APPLICATION FILED APR. 8, 1908.

949,780.

Patented Feb. 22, 1910.
3 SHEETS—SHEET 1.

Witnesses
Walter B. Payne
H. S. S. Simms

Inventor
George N. Saegmuller
By Church & Rich
his Attorneys

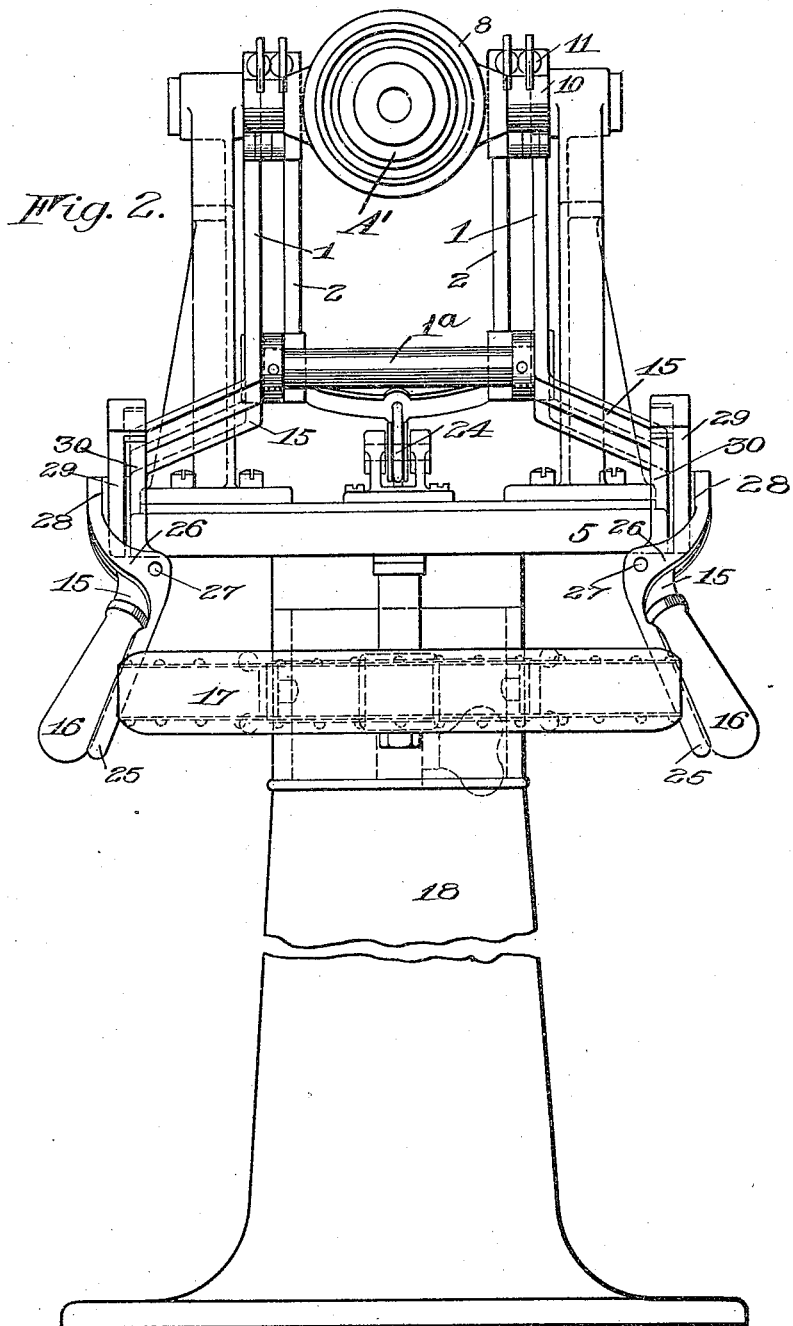

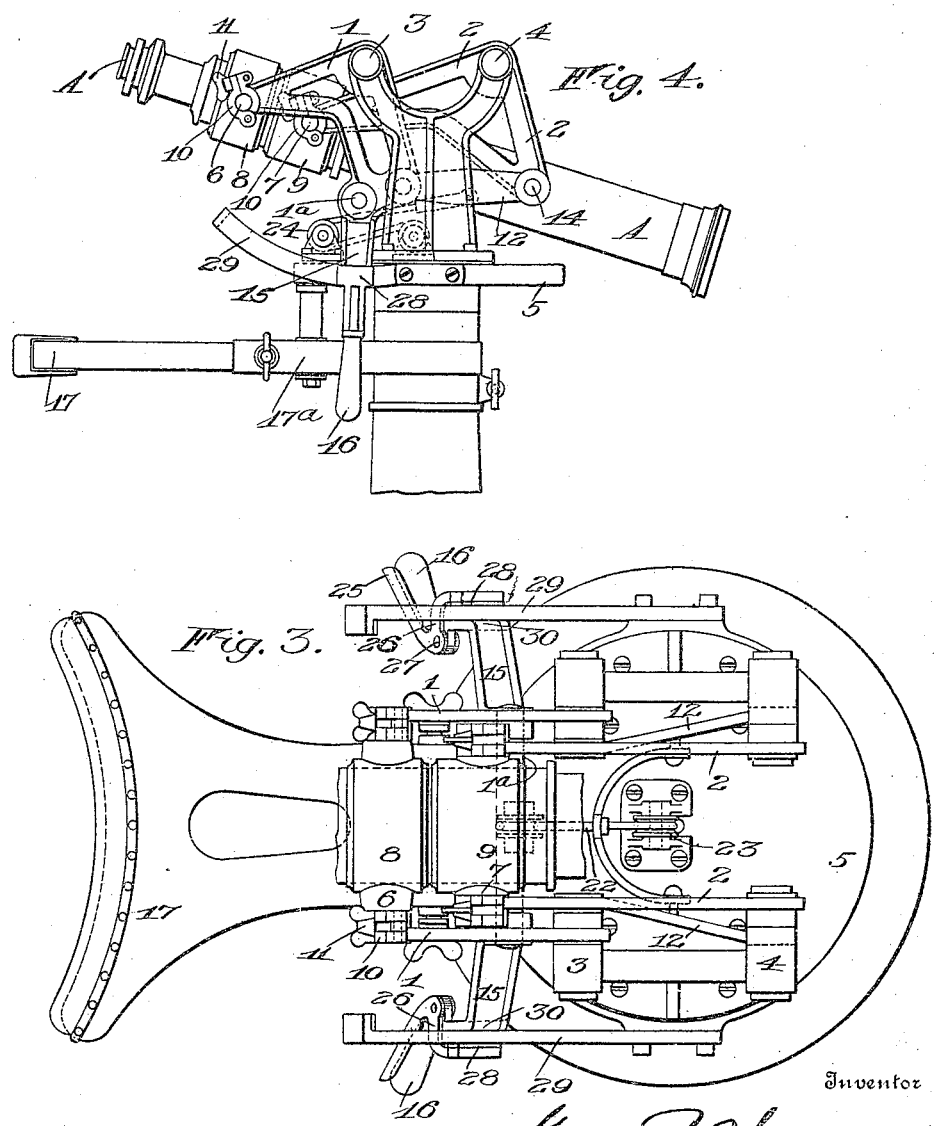

UNITED STATES PATENT OFFICE.

GEORGE N. SAEGMULLER, OF ROCHESTER, NEW YORK, ASSIGNOR TO BAUSCH & LOMB OPTICAL CO., OF ROCHESTER, NEW YORK, A CORPORATION OF NEW YORK.

TELESCOPE-MOUNT.

949,780.  Specification of Letters Patent.  Patented Feb. 22, 1910.

Application filed April 8, 1908. Serial No. 425,803.

*To all whom it may concern:*

Be it known that I, GEORGE N. SAEGMULLER, of Rochester, in the county of Monroe and State of New York, have invented certain new and useful Improvements in Telescope-Mounts; and I do hereby declare the following to be a full, clear, and exact description of the same, reference being had to the accompanying drawings, forming a part of this specification, and to the reference characters marked thereon.

The present invention relates to mountings for telescopes of the type in which the telescope is adjusted vertically without materially shifting the position of the eye-piece, such for instance as those employed on board a vessel at sea, where the telescope must be shifted to be accommodated to the motion of the vessel.

It has for an object to control the position of the telescope by means which coöperates with the telescope at points away from the eyepiece in order that the latter may be reached easily to manipulate the same.

Another object is to mount the counterbalancing device in a position so that it will not impose any obstacle to the turning of the telescope in azimuth.

To these and other ends the invention consists in certain improvements and combinations of parts all as will be hereinafter more fully described, the novel features being pointed out in the claims at the end of the specification.

In the drawings: Figure 1 is a view showing one embodiment of my invention in side elevation; parts being shown in section. Fig. 2 is a view showing an elevation of the eyepiece end of the instrument. Fig. 3 is a plan view of the instrument with portions of the telescope broken away; and Fig. 4 is a side view showing the telescope in another position.

In this embodiment of the invention there is employed a mechanism for effecting the movement of the telescope A vertically about an axis substantially coincident with the eyepiece A'; said mechanism comprising a plurality of devices coöperating with the telescope at a plurality of points in the direction of its length and away from the eyepiece to cause it to move at different speeds at these points. These devices in this instance comprise vertically movable supports 1 and 2 preferably arranged in pairs and in the form of bell crank members, the supports 1 being connected by a rod $1^a$. These supports are carried by an azimuth table 5 and are pivoted in the same horizontal plane at 3 and 4 respectively on opposite sides of the said table, and at 6 and 7 respectively to the opposite sides of sleeves 8 and 9. When the telescope is in normal position, the trunnions or pivots 6 and 7 are horizontally alined with pivots 3 and 4.

The sleeves 8 and 9 surround the telescope, the sleeve 9 being adapted for a slight sliding movement thereon. They carry the trunnions 6 and 7 on which the members 1 and 2 turn, and these trunnions turn in bearings which may be opened to remove the telescope. For this purpose these bearings comprise swinging members 10 which are held in closed position by fastening devices 11.

Connection is provided between the supports 1 and 2 to cause points 6 and 7 to move at such a ratio of speed that the telescope turns about an axis substantially coincident with the eyepiece. In the present instance, this connection is in the form of links 12 pivoted at 13 and 14 to the supports 1 and 2 respectively, the pivots 13 and 14 being horizontally alined, and being located vertically below the pivots 3 and 4 providing a parallel link motion. It will be noted that the supports 2 with links 12 provide means connecting the telescope and the supports for turning the telescope about its axis or pivot 6 as the said axis is moved. Further it will be noted that the pivots 6 and 7 are caused to move in substantially parallel lines, in this instance in two arcs, the one nearer the eyepiece moving at a slower speed.

In order to control the vertical position of the telescope there are provided arms 15 depending from the supports and having hand pieces 16 at their lower ends, while the horizontal adjustment of the telescope is effected by a breast piece 17 which is supported from the azimuth table 5 by an arm $17^a$. As the operator employs both hands for adjusting the telescope vertically, there must be provided some means for preventing the instrument being thrown suddenly to a limit of its movement, due to the operator losing his balance on account of the rolling of the vessel. For this purpose, braking devices are employed between the telescope and the azimuth table. These braking devices are under the control of the operator and preferably have their controlling portions in the form of handle pieces 25 arranged parallel with and in proximity to hand pieces 16 and secured to bent levers 26 that are pivoted to arms 15 at 27 and are bifurcated and straddle the said arms 15, the outer ends of the levers being provided with braking surfaces 28 that coöperate with the outer faces of curved arms 29 secured to the azimuth table. The outer faces of arms 15 are provided with braking surfaces 30 which coöperate with the inner faces of curved arms 29. The operator at all times maintains a grip on hand pieces 16 and 25 and when the vessel gives a sudden lurch, he unconsciously grips them tighter to prevent falling, thus applying the brakes.

The azimuth table is rotatably mounted on a pedestal or standard 18 which is made hollow in order to receive a counterbalancing device, preferably comprising a helical spring 19 arranged within a sleeve 20 depending from the azimuth table so that the longitudinal axis of the spring is coincident with the turning axis of the said table. The spring has its lower end adjustably secured at 21 to the bottom of the tube or sleeve 20, while its upper end is secured to a flexible connection 22 which passes about a pulley 23 arranged on the azimuth table directly above the spring and thence about a pulley 24 also on the azimuth table, its other end being divided and secured to the links 12. By the employment of a spring instead of a weight to hold the telescope at normal position, the action of the counterbalancing device is not affected by the rolling of the vessel, and by locating it directly in line with the turning axis of the azimuth table, its weight does not interfere with the turning of the table as it would if located to one side of the axis.

The operation of the invention will be understood from the foregoing, and only a general statement will now be given. The operator stands with his breast against the breast piece 17 and both hands on the grips 16 and 25, moving the telescope vertically to agree with the rolling of the ship, while his eye is at the eyepiece. During the vertical movement of the telescope the eyepiece moves very little, maintaining practically one position. The telescope is adjusted in azimuth by pressure on the breast piece to one side or to the other.

An instrument constructed in accordance with this invention is inexpensive to manufacture, and simple in operation, the parts being so arranged that the rolling of the vesvel does not interfere with the operation.

I claim as my invention:

1. The combination with a telescope, of a mechanism for effecting the movement of the telescope vertically about an axis substantially coincident with the eyepiece, embodying a plurality of devices coöperating with the telescope at a plurality of points to cause the said points to move at different speeds.

2. The combination with a telescope, of a pair of vertically movable and connected supports for the telescope secured to the latter at two points in the direction of its length and away from its eyepiece, and having their points of connection with the telescope movable at such a ratio of speed that the telescope turns about an axis substantially coincident with its eyepiece.

3. The combination with a main support, a support movable thereon and a telescope pivoted to the movable support, of means connecting the movable support and the telescope for causing the movable support to move simultaneously with the turning of the telescope on its pivot.

4. The combination with a main support, a support movable thereon and a telescope pivoted to the movable support, of means connecting the movable support and the telescope for causing the movable support to move simultaneously with the turning of the telescope on its pivot and having provision for maintaining the eyepiece of the telescope substantially at one point during the movement of the telescope.

5. The combination with a telescope, of mechanism for controlling the movement of the telescope, connected to the latter at a plurality of points removed from the eyepiece and having provision whereby the connecting points move at such a ratio of speed that the telescope turns about an axis substantially coincident with its eyepiece.

6. The combination with a telescope, of mechanism for controlling the movement of the telescope embodying a plurality of supports connected to the telescope at a plurality of points removed from the eyepiece and connection between the supports maintaining a fixed ratio of speed between the points of connection with the telescope.

7. The combination with a telescope, of a pair of vertically movable supports on which the telescope is pivoted at two points in the direction of its length, and connection between the supports causing them to move together.

8. The combination with an azimuth table adjustable in azimuth, of two bell crank members pivoted to the azimuth table and to the telescope at two points in the direction of its length, and connection between the members causing them to move together.

9. The combination with an azimuth table adjustable in azimuth, of two supports pivoted to the azimuth table and to the telescope at two points in the direction of its length and a link connecting the supports.

10. The combination with a telescope, of a pair of vertically movable supports on which the telescope is pivoted at two points in the direction of its length, connection between the supports causing them to move together, and a counterbalancing device for the telescope acting on the supports.

11. The combination with a rotary azimuth table, of a telescope mounted on the table to move vertically, and a counterbalancing device for the telescope arranged in line with the turning axis of the azimuth table.

12. The combination with a pedestal, of an azimuth table rotatable thereon, a telescope mounted to move vertically on the table, and a counterbalancing device mounted in the pedestal and connected with the telescope.

13. The combination with a rotary azimuth table, of a telescope mounted to move vertically thereon, and a helical spring having its longitudinal axis coincident with the turning axis of the azimuth table, and connected with the telescope and the table.

14. The combination with a pedestal, of an azimuth table rotatable thereon, a telescope movable vertically on the table, a sleeve depending from the table into the pedestal, and a counter-balancing device for the telescope mounted in the sleeve.

15. The combination with a pedestal, of an azimuth table rotatable thereon, a telescope movable vertically thereon, a sleeve depending from the table into the pedestal, a helical spring mounted in the sleeve and connected thereto, and a flexible connection between spring and the telescope.

16. The combination with an azimuth table adjustable in azimuth, of two supports pivoted to the azimuth table and to the telescope at two points in the direction of its length, connection between the supports causing them to move together, and an operating arm extending from one of the supports.

17. The combination with a telescope mounted to swing vertically, of mechanism for moving said telescope embodying a hand piece, and a braking device for retarding the movement of the telescope having a hand piece located in proximity to the first named hand piece.

18. The combination with an azimuth table adjustable in azimuth, of two supports pivoted to the azimuth table and to the telescope at two points in the direction of its length, connections between the supports causing them to move together, an arm secured to one of said supports, a curved arm carried by the azimuth table, and a braking device carried by the first named arm and adapted to engage the curved arm.

19. The combination with an azimuth table adjustable in azimuth, of two supports pivoted to the azimuth table and to the telescope at two points in the direction of its length, connection between the supports causing them to move together, and a braking device carried by one of said supports and adapted to coöperate with a part on the azimuth table.

20. The combination with an azimuth table adjustable in azimuth, and a telescope, of a pair of sleeves surrounding the telescope one having a sliding movement thereon, two pairs of supports each pair being pivoted to the opposite sides of a sleeve, and also to the azimuth table, and links, each connecting a support of one pair with a support of the other pair.

GEORGE N. SAEGMULLER.

Witnesses:
HENRY C. THON,
DANIEL M. SMITH.